July 2, 1957 H. P. KAREN 2,798,166
METHOD AND APPARATUS FOR STARTING GAS TURBINES
Filed April 14, 1955 7 Sheets-Sheet 2

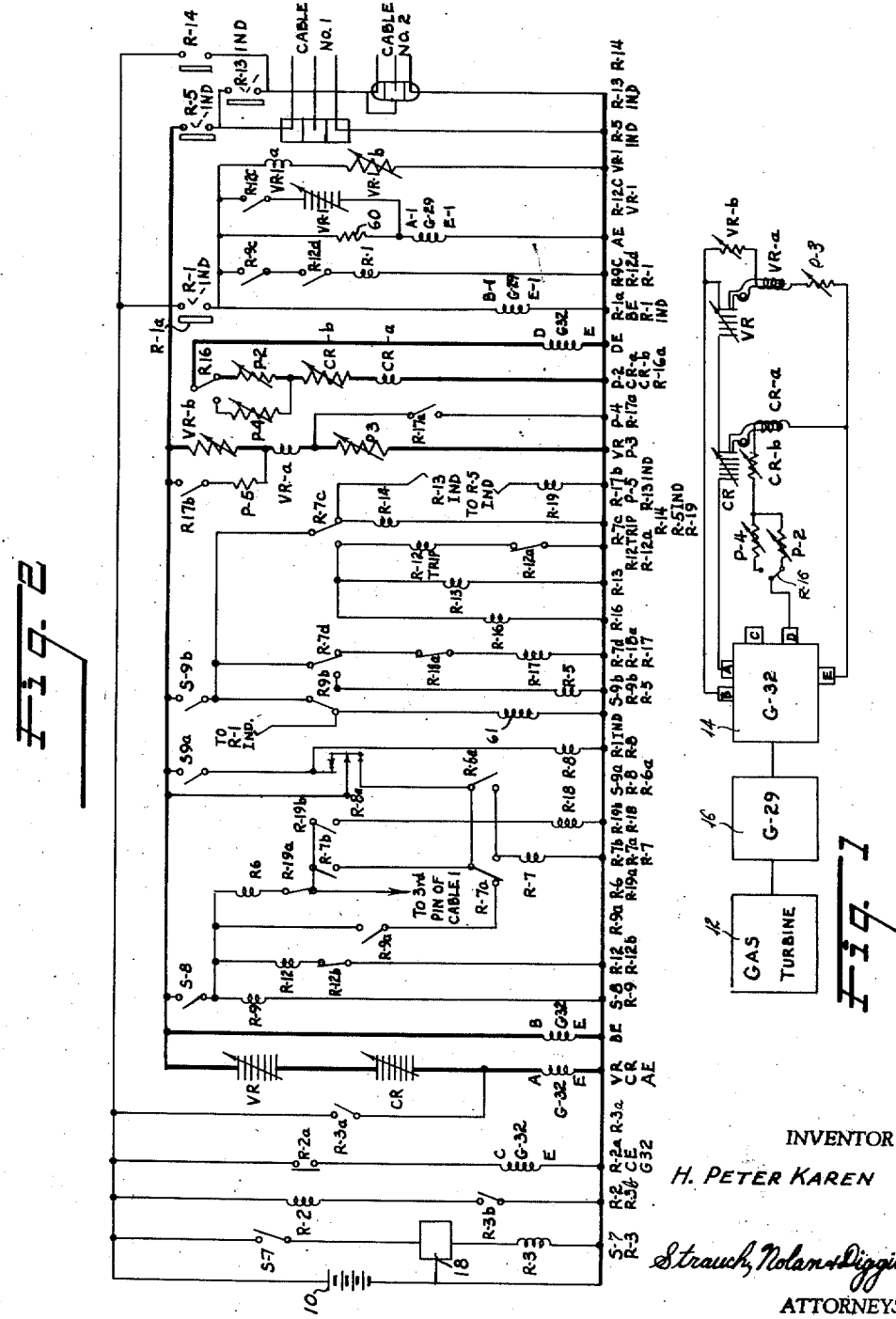

INVENTOR
H. PETER KAREN

BY Strauch, Nolan & Diggins
ATTORNEYS

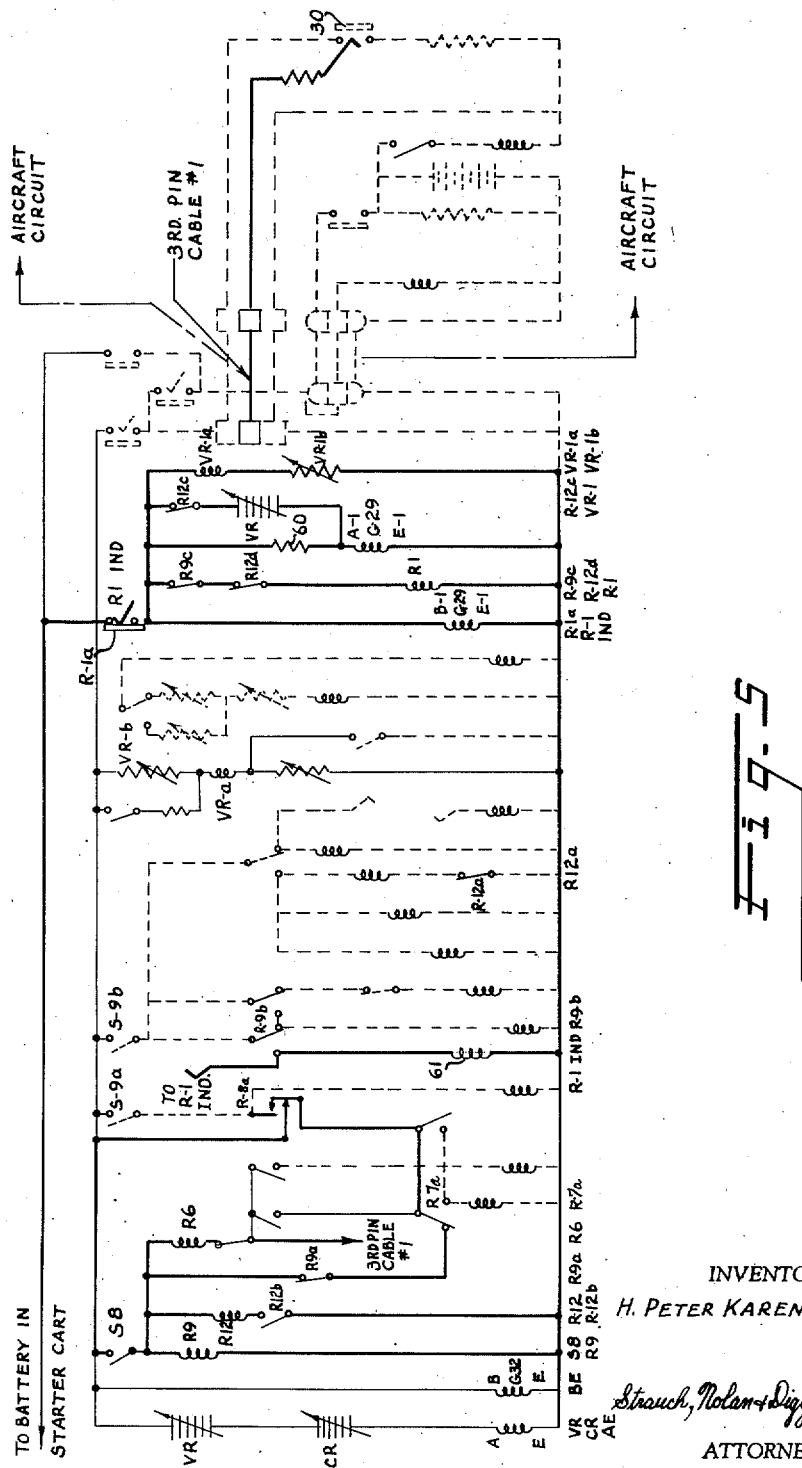

July 2, 1957 H. P. KAREN 2,798,166
METHOD AND APPARATUS FOR STARTING GAS TURBINES
Filed April 14, 1955 7 Sheets-Sheet 4

INVENTOR
H. PETER KAREN
Strauch, Nolan + Diggins
ATTORNEYS

July 2, 1957 H. P. KAREN 2,798,166
METHOD AND APPARATUS FOR STARTING GAS TURBINES
Filed April 14, 1955 7 Sheets-Sheet 5

INVENTOR
H. PETER KAREN
Strauch, Nolan & Diggins
ATTORNEYS

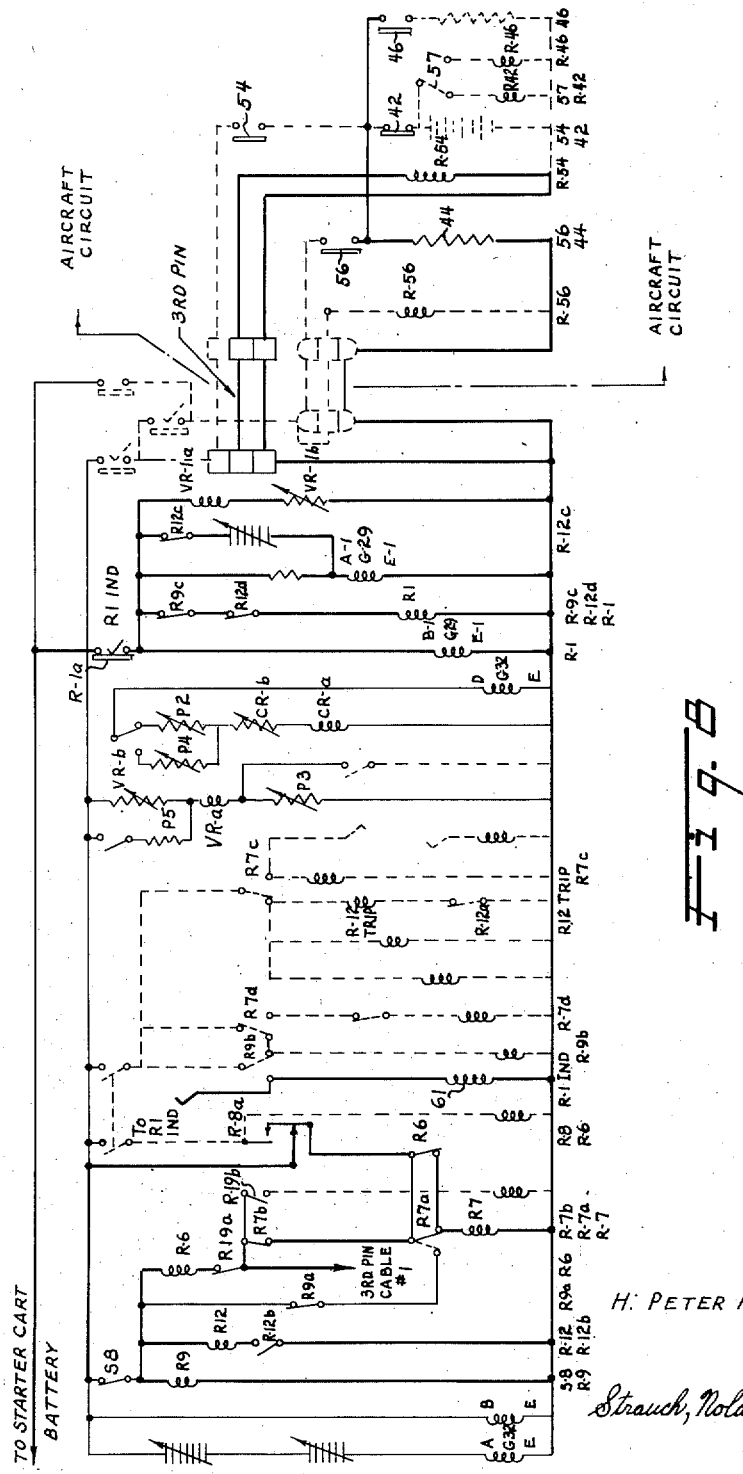

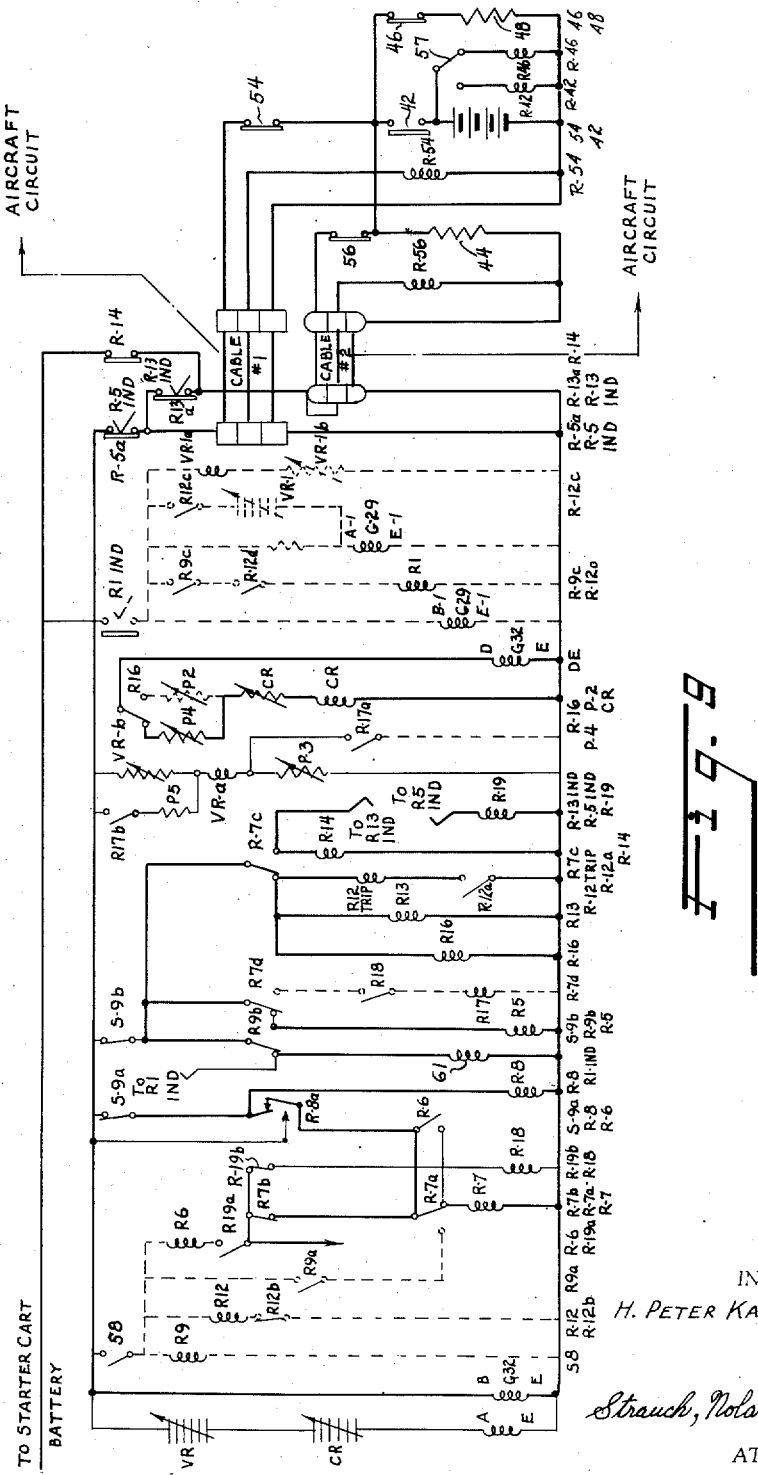

United States Patent Office 2,798,166
Patented July 2, 1957

2,798,166

METHOD AND APPARATUS FOR STARTING GAS TURBINES

H. Peter Karen, San Diego, Calif., assignor to Solar Aircraft Company, San Diego, Calif., a corporation of California Application April 14, 1955, Serial No. 501,262

16 Claims. (Cl. 307—18)

The present invention relates generally to control circuits for direct current dynamos and more specifically to auxiliary power units having generators for supplying power to motors for starting and servicing turbo-jet aircraft.

Early centrifugal flow jet engines were started by batteries carried within the aircraft. These same batteries provided power for aircraft service requirements such as lights, hydraulic systems, instruments, and the like. Comparatively low starting inertias and compression ratios of these engines coupled with a minimum of service requirement made it practical to provide all necessary power from batteries contained in the aircraft.

Even the advent of the early axial flow turbo-jet engines with a demand for greater starter power based upon increased inertias and higher compression ratios merely called for a larger number of bigger batteries in the aircraft. However, larger engines and an increasing demand for service power soon necessitated the introduction of a power source external of the aircraft to boost the power supplied by the plane's batteries during starting operations. The early solution was to supply a series of batteries on a mobile land vehicle. Increasing load demands soon required the employment of gasoline reciprocating engine generator sets, commonly called auxiliary power units.

More advanced and larger jet engines coupled with greater service circuit demands over-taxed existing auxiliary power units and thereby created a need for larger reciprocating engines. Reciprocating engines adequate to perform the required tasks were far too heavy and bulky for starter carts adapted to be manually maneuvered. A gas turbine has been accordingly introduced as a lightweight prime mover.

To this point, aircraft were equipped with common bus electrical systems. However, as starting power requirements trended upward, it became evident that independent power sources were required for starting and service circuits since the great momentary starting drain often reduced the voltage applied to the service power to such a degree that vital service auxiliary units failed and caused extensive engine damage. For example, the automatic fuel control was a typical component which frequently failed due to low voltage.

Aircraft designers now have introduced the split bus system wherein the starting and the service units have separate and distinct circuits and frequently common bus and split bus type aircraft are mixed in the same squadron. Rather than design starter carts for each type, existing starter carts were originally modified with a series of switches and other manually operated arrangements so the cart could service either type of plane. However, from outward appearances it is extremely difficult to distinguish one type of craft from the other, and frequently, planes and starter carts were seriously damaged when the wrong type of power was supplied through inadvertent failure to correctly identify the electrical wiring system in the plane to be serviced.

Due to the great starting inertias of the larger engines, the sudden application of power from the powerful independent starting generator often creates damaging torques which break starter shafts and other mechanical components. It has accordingly been proposed to reduce the initial starting voltage applied to the aircraft starter motors and to allow the voltage to build up gradually as the aircraft engine picks up speed. In such a system, as for example, is disclosed in U. S. Patent No. 2,662,986 to Vintenon, no provision has been made for controlling the maximum current produced by the generator without initially reducing the voltage below its design value so that it can be used with common bus electrical systems or for separately supplying the design value voltage to the service load in split bus electrical systems.

These and other problems are solved by the present invention which provides a unique sensing circuit that unerringly determines the type of aircraft electrical system in the aircraft being started and automatically sets up the proper starting circuit arrangement upon being electrically connected to the aircraft. This eliminates the possibility of damaging the jet engine of the aircraft or the prime mover on the starter cart.

As further features, an initially low starting voltage is supplied when the unit is connected to a split bus electrical wiring system while the rated voltage is initially supplied when the unit is connected to a common bus electrical system. With either system, the current supplied by the generator connected to the starter motor is limited so that it does not exceed a safe value, and the starter cart battery is always connected in parallel with one or the other of the starter cart generators and to the aircraft service circuit to aid in supplying rated voltage to the service circuit. This arrangement also assures that the starter cart battery is recharged with each operation of the starter cart so that it in turn may be used to start the prime mover on the starter cart.

It is accordingly a major object of this invention to provide a lightweight portable starting unit capable of supplying adequate power for starting and servicing present day turbo-jet aircraft engines.

It is another object of this invention to provide a power source especially adapted for starting gas turbine engines which produces a "soft start" and at the same time supplies rated voltage to the service equipment.

It is a further object of this invention to provide a power source especially adapted for supplying power during the starting operation of gas turbine engines where the turbine starting motor and service circuits are in parallel by supplying limited current from a generator while maintaining adequate voltage on the service equipment.

It is a still further object of this invention to provide a portable starter unit adapted for supplying power to aircraft having different types of electrical wiring systems and which automatically establishes internally of the starter unit the proper circuit arrangement in accordance with the type of electrical circuit to which it is connected.

Still another object of this invention is to provide a novel method of internal circuit operation of a portable starter unit which first determines the type of electrical circuit to which it is connected and then controls operation of the starter unit circuits accordingly.

It is another object of this invention to provide a starter circuit having regulated current flow from a generator having an auxiliary winding on the armature which produces power for operating a control element that regulates maximum current.

A still further object of the present invention is to provide a circuit for changing the regulated maximum current flow in accordance with the type of electrical wiring system connected with the gas turbine starter motor.

A further object of this invention is to provide a starter circuit which selectively connects the starter cart storage battery and a generator in parallel to the service equipment, establishes a circuit including a generator to the starter motor, and always limits the maximum current from the generator connected to the starter motor to prevent excessively high starting torques.

These and other objects of the invention will become more fully apparent from the claims and as the description proceeds in connection with the drawings wherein:

Figure 1 is a block diagram of the basic elements on the starter cart;

Figure 2 is a circuit diagram of the electrical components in the power and control circuits on the starter call;

Figure 6:
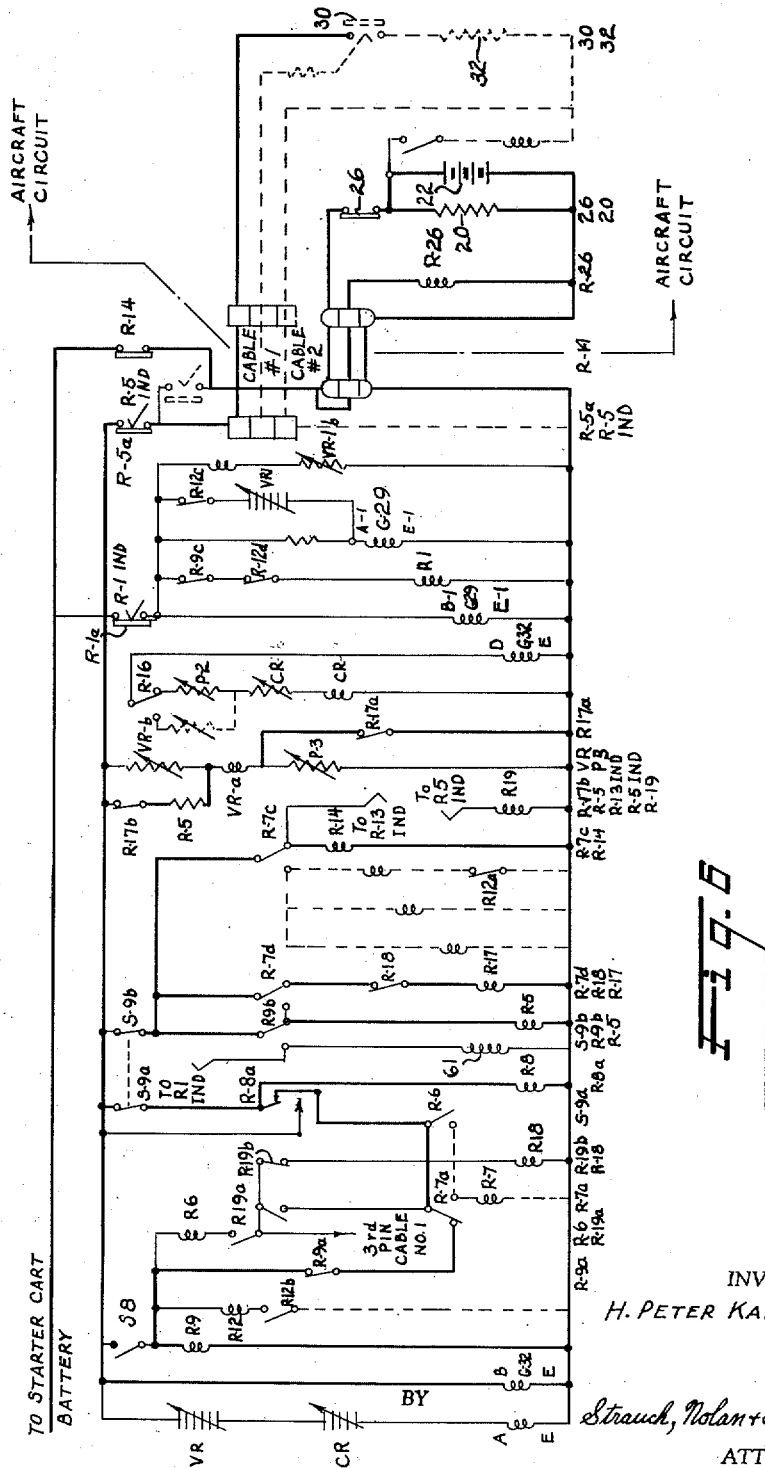
Figure 7:
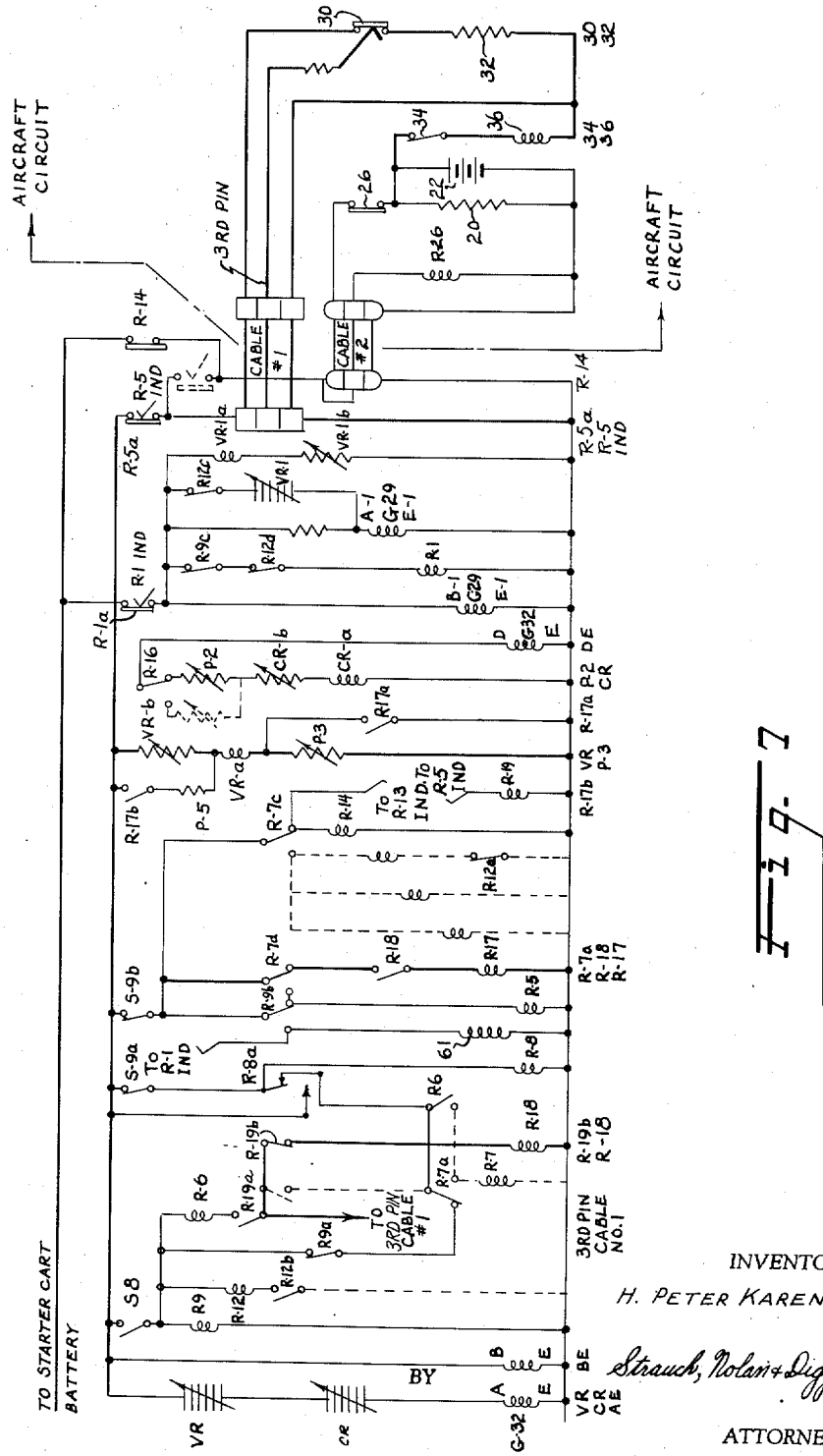

Figures 5 through 7 illustrate the operating sequence of the components on the starter cart during the starting operation of a turbo-jet engine in an aircraft having the split bus electrical wiring system; and Figures 8 and 9 illustrate the sequence of operation of the starter cart circuit components during the starting operation of the turbo-jet engine in an aircraft having the common bus electrical wiring system.

All of the equipment diagrammatically illustrated in Figures 1 and 2 is carried by a portable starter cart and includes battery 10, prime mover 12 and a pair of electrical dynamos 14 and 16. Dynamo 14, referred as G–32, is a 500 ampere starter generator having a common terminal E that is grounded, a generator field terminal A, a main generator armature terminal B, a motor starter terminal C and an auxiliary armature terminal D.

A master starter switch S–7 shown in Figure 2 adjacent battery 10 effects completion of a circuit which when closed includes motor starter winding CE and field winding AE of generator G–32 with battery 10. This circuit includes speed switch 18 of a conventional construction in series with relay coil R–3. When the prime mover has been started and reaches a predetermined speed, switch 18 opens and de-energizes coil R–3 thus causing contacts R–3b to open thereby de-energizing coil R–2 and opening contacts R–2a which are in series with starter winding CE. From this time on the prime mover is self-sustaining with fuel injection and ignition controlled automatically to provide the power necessary to turn the armatures of both generator G–32 and G–29.

Prime mover 12 may be an internal combustion engine of any desired type. An important characteristic of the prime mover is ease of starting in temperatures ranging from −54° C. to +55° C. and since the starter cart is intended to be moved from one airplane to another by the operator and preferably without requiring the use of an auxiliary tractor, the bulk and weight of prime mover 12 should be as small as possible while still providing the necessary power output. A gas turbine engine has accordingly been found quite suitable for this purpose.

The voltage output of armature winding BE of generator G–32 is controlled by feedback through voltage regulator VR and current regulator CR to field winding AE. Field winding AE is disconnected from battery 10 by contacts R–3a which open when coil R–3 is de-energized. Voltage regulator VR comprises an electromagnetic coil VR–a which produces a variable regulating force on an arm pressing against a carbon pile to effect change of resistance of the pile in accordance with current through the coil. Included in series with coil VR–a are two variable resistances VR–b and P–3 connected across the terminals of armature winding BE.

Carbon pile VR is connected in series with a second similar carbon pile CR and to the non-grounded terminal A of field winding AE. The circuit for controlling carbon pile CR is across auxiliary armature winding DE through switch contact R–16a to potentiometer P–2 and to ground through an adjusting resistor CR–b and electromagnetic coil CR–a which provides the positioning force on the pressure arm on the carbon pile.

The feedback potential to the field winding AE of generator G–32 is controlled by the magnetic effect of coils VR–a and CR–a on the resistance of VR and CR carbon piles. As the potential reaching coils VR–a and CR–a increases, the coils react on their respective arms to cause the resistance of the carbon piles to increase. An increase in the carbon pile resistance results in a reduction of the field current through generator field coil AE which in turn reduces the field excitation thus reducing the generator output voltage from armature winding BE.

The remaining elements in the circuit will be discussed in the description of the operation of this equipment at the point they become active. The following list identifies each of the several elements and their intended function.

| Symbol: | Function |
|---|---|
| CR | G–32 current regulator. |
| P2 | 800-amp. control potentiometer. |
| P3 | Voltage control potentiometer. |
| P4 | 1000-amp. control potentiometer. |
| R1 | G–32 to battery contactor |
| R2 | Motor start contactor on starter winding of G–32. |
| R3 | Start contactor pilot relay. |
| R5 | G–32 to cable 1 contactor. |
| R6 | Aircraft circuit type sensing relay. |
| R7 | Circuit transfer relay. |
| R8 | Circuit cancellation relay. |
| R9 | G–29 control relay. |
| R12 | Lock-in relay. |
| R13 | Cable 1 and cable 2 paralleling contactor. |
| R14 | Battery and G–29 to cable 2 contactor. |
| R16 | CR control relay. |
| R17 | VR control relay. |
| R18 | VR control release relay. |
| R19 | Sensing circuit control relay. |
| S7 | Powerplant start switch. |
| S8 | Momentary generator energization and control switch. |
| S9 | Starting power control switch. |
| VR | G–32 voltage regulator. |
| VR–1 | G–29 voltage regulator. |
| Cable #1 | Starter power cable on split bus system. |
| Cable #2 | Service power cable on split bus system. |

Cables No. 1 and No. 2 shown in Figure 2 are adapted to be connected to cable terminals on the turbo-jet aircraft to thereby make available the D. C. power from the starter cart for starting the aircraft engines. Certain squadrons in the armed forces have identical types of planes but some of the planes have what is commonly known as the spilt bus type of electrical wiring system as illustrated in Figure 3 and others have a common bus type of electric wiring system as illustrated in Figure 4.

Figure 3:
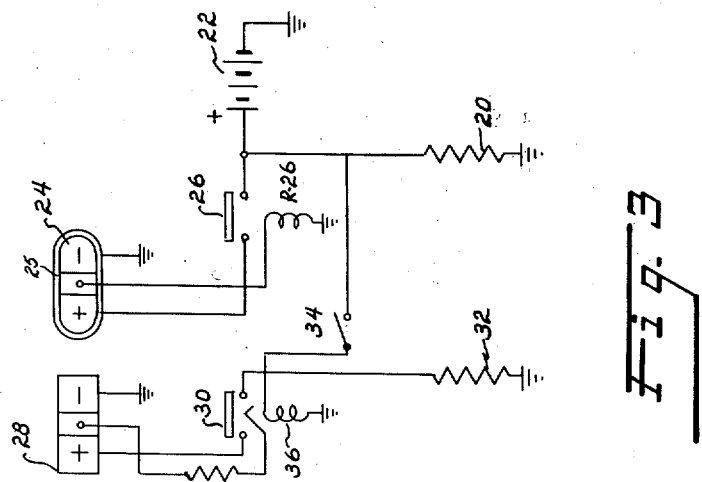
Figure 3 is a diagrammatic representation of the split bus electrical wiring system commonly used on aircraft.

In split bus systems as shown in Figure 3, the service load 20 is connected to the aircraft battery 22. The terminals in receptacle 24 are connected through an external power relay 26 to the positive terminal of aircraft battery 22 to permit an external power source to charge the battery and/or produce the power required for service load 20.

The terminals in receptacle 28 are connected through starter drop-out relay 30 to the starter load 32. Starter switch 34 connects one end of relay coil 36 to the aircraft battery but it should be noted that battery 22 does not supply any power to the starter load.

Figure 4:
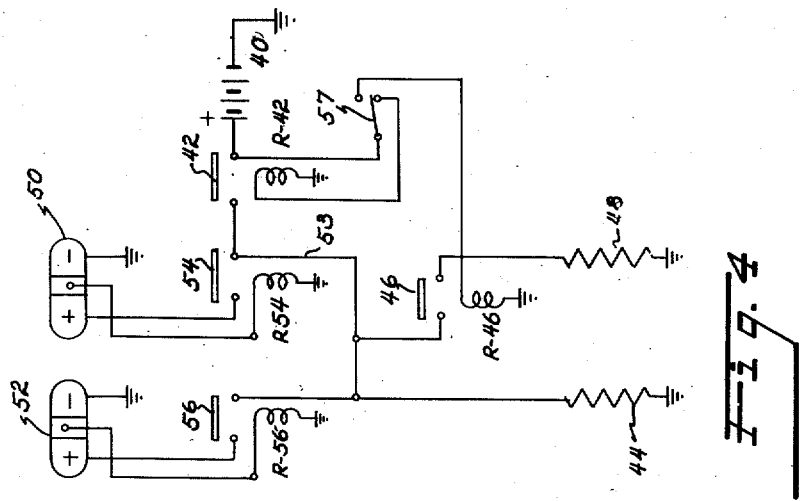
Figure 4 is a diagrammatic illustration of the common bus electrical wiring system commonly used on aircraft.

In the common bus system illustrated in Figure 4, aircraft battery 40 is connected through normally closed relay contacts 42 to service load 44. External cable receptacles 50 and 52 are connected to the main power bus 53 through external power relays 54 and 56 respectively and when relays 54 and 56 are closed the battery and the power leads in both receptacles 50 and 52 are in parallel to feed service load 44 and charge the aircraft battery. When starter switch 57 is moved to its illustrated position, starter solenoid R–46 is energized while coil R–42 is de-energized thus opening battery relay contacts 42. Starter load 48 and service load 44 are connected in parallel to both power receptacles 50 and 52 and disconnected from the aircraft battery.

Prior art starter carts included manually operated switching arrangements on the cart for regulating and controlling the power applied to each shielded receptacle when the aircraft motor was started. The present invention has apparatus for sensing which of the two types of electrical circuits are present in the particular aircraft to be started as soon as the cables are connected to the receptacles and for automatically switching the various circuits to their proper condition prior to beginning of the aircraft engine starting operation in addition to controlling the voltage and current generated during the starting operation.

In the explanation of Figures 5 through 9 the heavy lines indicate action happening in that particular circuit during the discussion of the figure involved, light solid lines indicate either that the line is energized or has been alerted for subsequent energization and the dotted lines indicate parts of the system which are playing no active part during the described operation of the equipment.

*Split bus starting operation*

The operating sequence of the circuits in the starter cart when used to start a turbo-jet aircraft engine in an aircraft having a split bus type aircraft electrical system is illustrated in Figures 5 through 7. Prior to connecting the cables to the aircraft for starting the aircraft engine, the power plant on the starter cart is in full operation and generator G–32 is supplying rated voltage through the main armature winding BE. The voltage is under control of two carbon pile resistance units VR and CR in series with the generator field winding AE, though actual regulation at light loads is controlled by regulator VR.

Momentarily closing switch S–8 energizes coil R–9 closing contacts R–9a and R–9c and transferring contacts R–9b to the position illustrated in Figure 5. Coil R–12 is energized thus opening contacts R–12b and closing contacts R–12a, R–12c and R–12d. R–12 is a lock-in type relay having two stable positions and the contacts accordingly remain in the new position even though coil R–12 is immediately de-energized due to the opening contacts R–12b. This relay includes an additional trip coil for returning the contacts to their initial position when the circuit through contacts R–12a is energized. This circuit is not energized until cables 1 and 2 are connected to an aircraft having a common bus electrical system.

Coil R–9 remains energized even after switch S–8 is opened through contacts R–9a, R–7a and R–8a unless the circuit through the third pin of cable 1 is completed to ground. In the illustrated split bus system, the third pin of cable 1 remains open at contactor 30 of the starter drop-out relay in the aircraft.

The field coil A–1, E–1 of generator G–29 is connected across its armature winding B–1, E–1 through a large resistor 60 which keeps the generated voltage to a low level when switch contacts R–12c are open. Since contacts R–12c are now closed, the armature voltage of generator G–29 at terminals B–1, E–1 is allowed to build up and is controlled by voltage regulator VR–1 having control coil VR–1a and variable resistance VR–1b in series across its armature winding. Voltage regulation is maintained by the feedback potential to field winding A–1, E–1 through the carbon pile of voltage regulator VR–1 in the same manner as described in connection with generator G–32. As soon as the voltage of generator G–29 reaches the value of the voltage of the starter cart battery, relay coil R1 in series with closed contacts R–9c and R–12d is energized. When the contacts of relay R–1 close, the indicator to of R–1, identified in the drawings as R–1 IND, energizes a fuel control valve solenoid 61 in the power plant enabling the power plant to operate under load. The battery in the starter cart is recharged by generator G–29 during this time.

R–1 IND is physically part of relay R–1 and is connected to the relay armature R–1a only when the coil R–1 is energized. Its connection to the fuel valve solenoid 61 is separately indicated in the drawings to simplify presentation of the circuit diagram in the drawings. A similar method of designation has been used in the drawings for relays R–5 and R–13 also similarly constructed with indicator contacts designated R–5 IND and R–13 IND shown both at the physical location of associated contacts R–5a and R–13a and in the circuit they control.

Referring now to Figure 6 the manual opening of switch S–8 is followed by closure of manual switches S–9a and S–9b which immediately energizes relay coils R–8, R–5, R–17 and R–14. The holding circuit for keeping coil R9 energized is through contacts R–9a and R–7a and R–8a, the latter contacts transferring from the dotted line position to the full line position upon the energization of coil R–8. The holding circuit is maintained by using a make-before-break contact arrangement on relay R–8. However, opening switch S–9a will de-energize coil R–8 and coil R–9 simultaneously.

Energization of coil R–5 through switch contacts R–9b and S–9b closes switch contactor R–5a thereby connecting the armature BE of generator G–32 to cable 1 and energizing the indicator, R–5 IND which then energizes R–19 thus causing contacts R–19a to open and contacts R–19b to close as illustrated in Figure 6. Opening relay contacts R–19a prevents a returning signal through the third pin of cable 1 from energizing coil R–6 when starter drop out relay 30 in the aircraft is closed which would result in a premature de-energization of coil R–9. This would occur if coil R–6 was allowed to energize due to the actuation of coil R–7 through contacts R–6a, which in turn would cause contact R–7a to open the power source to coil R–9. The closing of contacts R–19b has no effect on the circuit at this time, but does set up the circuit through contacts R–19b so that when the starting operation of the aircraft engine begins, certain functions described below automatically come into operation.

Coil R–17 is energized through relay contacts R–18a which are normally closed, contacts R–7d which are normally in the position illustrated and contact S–9b which is now closed. With switch contacts R–17a and R–17b closed, voltage regulator coil VR–a has much greater voltage across it than when resistors VR–b and P–3 are in series with it and carbon pile VR is therefore controlled to reduce the magnitude of voltage generated by armature BE of generator G–32 to a much lower value than the 28 volts normally supplied.

Coil R–14 is energized through contacts R–7c illustrated in their normal position in Figure 6 and contacts S–9b. Contactor R–14a is then closed by coil R–14 to connect the common starter cart battery and generator G–29 circuit through cable 2 to the aircraft electrical service circuit.

At this point it should be noted that the full 28 volts is applied to the aircraft electrical service circuits through cable 2 while a voltage of reduced magnitude is applied through cable 1 to the aircraft starter circuit.

Referring now to Figure 7, closing starter switch 34 in the aircraft energizes starter relay coil 36. Starter drop-out relay contacts 30 are thus closed and the starting of the aircraft engine 32 begins.

The third pin in cable 1 is now energized and coil R-18 is energized through switch contacts R-19b. Relay contacts R-18a then open thus de-energizing coil R-17 and opening contacts R-17a and R-17b thus inserting resistance VR-b and P-3 in series with voltage regulator coil VR-a. The resistance of carbon pile VR is immediately decreased to permit the voltage from armature winding BE of generator G-32 to attempt to return to normal.

At the time starter drop-out relay 30 closes, the aircraft engine starting load falls on generator G-32. Winding DE on generator G-32 is an auxiliary armature winding whose voltage output at no load on the main armature winding BE is determined by the field due to current through field winding AE but is so related with the main armature winding BE that when the starting current of several hundred amperes is present in armature winding BE, additional electrical output is produced in winding DE that is proportional to the magnitude of current present in armature winding BE. This increased voltage causes an increased current flow through coil CR-a which causes the resistance of carbon pile CR in series with field winding AE of G-32 to increase.

Winding DE may be wound about the same armature as winding BE so that the two windings are inductively coupled whereby current flow through winding DE is controlled primarily by the magnitude of current flowing through armature winding BE. Thus by having current regulator coil CR-a in series with winding DE and the variable resistance controlled by coil CR-a in series with the field winding AE, the maximum current flow through the main armature winding BE is regulated by the adjustment of potentiometers P-2 and CR-b. Potentiometer P-2 is pre-adjusted to control the maximum current supplied by generator G-32 so that it does not exceed a value of, for example, 800 amperes.

Since the voltage applied to the aircraft starter motor was reduced by the operation of contacts R-17a and R-17b prior to the initiation of the starting operation of the aircraft engine, the normal initial current surge is prevented. By maintaining a control responsive to the current supplied to the aircraft starter motor for regulating the field excitation of G-32, a quick build-up of the voltage is retarded whereby the starting torque produced by the aircraft started motor is more nearly constant over the first several seconds thereby producing a more nearly constant acceleration and a "soft start."

In summarizing the starting operation, the initial voltage applied to the aircraft starter motor at the time contacts 30 of the starter drop-out relay are closed is controlled by resistance P-5 to be, for example, approximately 14 volts due to the action of switch contacts R-17a and R-17b paralleling resistors P-3 and VR-b respectively. As soon as contacts 30 are closed, contacts R-17a and R-17b open. As the starting current load through armature winding BE approaches the 800 ampere value, current through coil CR-a causes the resistance of carbon pile resistor CR to increase. This action prevents immediate build-up of the armature voltage, but allows the voltage to build up at a rate such that the current does not exceed 800 amperes. This results in a gradual almost linear voltage increase to the range where the voltage regulator coil VR-a resumes control during which time the current varies from approximately 800 to 750 amperes. After the rated voltage is reached by armature winding BE of G-32, its current reduces as the speed of the aircraft starter motor and its back EMF increases. Carbon pile CR then no longer has a significant role in controlling the field current in G-32 and voltage regulator VR controls the maximum voltage generated by G-32 in accordance with adjustments of potentiometers VR-b and P-3.

As soon as the aircraft engine is started, the starter cart operator opens switches S-9a and S-9b thus de-energizing coil R-9 and opening contacts R-9c and R-9d. This de-energizes coil R-1 thus disconnecting the starter cart battery from G-29. Coils R-5, R-14, R-18 and R-19 are also de-energized thus causing their respective contacts to revert to their initial position.

With the aircraft engine started, cables 1 and 2 may be removed and connected to another aircraft starter motor on the same or on a different aircraft and the starting operation repeated, or the gas turbine on the starter cart may be turned off.

Common bus starting operation

The sequence of operation of the circuits in the portable power cart when used to start the engine on an aircraft having a common bus type electrical system as shown in Figure 4 is illustrated in Figures 8 and 9. It will be assumed in this discussion that the prime mover on the starting cart is in operation and that the voltage output from generator winding BE of G-32 is under control of voltage regulator VR and that the cables are connected to the aircraft.

Momentary switch S-8 is closed thus energizing relay coils R-9 and R-12 as with the split bus electrical system. After R-12 is energized, contacts R-12b are opened and contacts R-12a, R-12c and R-12d are closed as illustrated in Figure 8. The contacts of R-12 remain in this position until coil R-12 trip becomes energized as will be explained subsequently. Generator G-29 is now energized and relay contactor R-1a is closed as explained in connection with the split bus system to charge the starter cart battery.

In aircraft having a common bus electrical system, the 3rd pin of cable 1 is immediately connected to ground through external power relay coil R-54 of the aircraft. This causes relay coil R-6 to energize through contacts R-19a and coil R-6. Contacts R-6a are then transferred to the illustrated position thus energizing relay coil R-7 and causing contacts R-7a, R-7b, R-7c and R-7d to transfer to the position illustrated in Figure 8. Contacts R-7a hold relay coil R-7 energized through switch contacts R-8a. Contacts R-7b close thus providing a circuit which continues supplying power to operate external power relay R-54 of the aircraft through the 3rd pin of cable 1 after contacts S-8 of momentary switch open.

Referring now to Figure 9, switch contacts S-8 are opened and contacts S-9a and S-9b are closed thus energizing relay coils R-8, R-5, R-16, R-13, and R-12 trip.

Energization of relay coil R-12 trip through contacts S-9b, R-7c and R-12a opens contacts R-12a, R-12c and R-12d and closes contacts R-12b. Excitation of field winding A-1, E-1 of generator G-29 is reduced when contact R-12c is opened and coil R-1 is de-energized when contact R-12d is opened thus opening contactor R-1a and removing power from R-1 IND in series with fuel control valve 61. However fuel control valve 61 remains energized because contacts R-9b have transferred by this time to the illustrated position due to de-energization of coil R-9 when S-8 opens.

Closing switch S-9a energizes coil R-8 thus transferring contacts R-8a and shifting the holding circuit for coil R-7 through switch S-9a. R-8a contacts are of a make-before-break arrangement to avoid de-energizing coil R-7 during transfer of R-8a contacts. Contactor R-5a closes due to energization of coil R-5 through contacts R-7d and S-9b thus connecting armature winding BE of generator G-32 to cable 1 and completing a circuit through R-5 IND thus energizing coil R-19.

Energization of coil R-19 opens contacts R-19a and closes contacts R-19b thus energizing coil R-18. The opening of contacts R-18a does not change the operation of the circuit since coil R-17 is not energized when R-7 is energized. Thus contacts R-17a and R-17b remain open and voltage regulator VR holds the voltage output from armature winding BE of generator G–32 to its rated voltage.

The energization of coil R–13 through contacts S–9b and R–7c closes contactor R–13a thus connecting cable 2 in parallel with cable 1. R–13 IND is connected to the positive bus thus energizing coil R–14 and causing contacts R–14a to close and connect the starter cart battery to the common cable circuit.

Energization of coil R–16 through contacts S–9b and R–7c changes control of the current through coil CR–a by transferring contacts R–16a to substitute variable resistance P–4 for variable resistance P–2.

At this time cables 1 and 2 are in parallel with both the starter cart battery and generator G–32 while generator G–29 is de-energized.

The starter cart is now ready for the aircraft engine starter motor 48 to be energized by transferring starter switch 57 in the aircraft to the position shown in Figure 9 thus energizing coil R–46 and closing contactor 46 to connect the positive conductors in both cables to the starter motor. Relay coil R–42 is de-energized thus disconnecting the aircraft battery during the starting operation. Both generator G–32 and the starter cart battery are connected in parallel to supply power to cables 1 and 2.

The maximum value of starting current supplied by generator G–32 is regulated by the resistance of carbon pile CR in series with the field coil AE of generator G–32. The amount of resistance added by carbon pile CR is controlled by the current flow in coil CR–a through the circuit including variable resistances P–4 and CR–b due to the voltage generated from winding DE of generator G–32. By proper adjustment of resistance P–4 the maximum current supplied by generator G–32 is limited to a predetermined value as for example, 1000 amperes. Additional current is supplied by the starter cart battery. As the back EMF of the starter motor increases and less current is demanded from armature winding BE, the resistance of carbon pile CR decreases thus allowing generator G–32 to supply proportionately more of the power for the starter motor.

In the process of controlling the maximum value of the current, the generator voltage drops to approximately 22 volts and gradually builds up to the rated value of 28 volts after a few seconds. The starter cart battery 10 in parallel with generator G–32 reduces the amount of line voltage drop that would otherwise occur when the generator current is limited by the action of carbon pile CR, and the battery accordingly supplies additional starting current during the time the generator voltage is building up to the rated voltage of the system.

The initial value of the battery current is several hundred amperes and rapidly falls off as the generated voltage builds up. The overall voltage supplied to the aircraft in a common bus system is, accordingly, never allowed to be as low as the initial value of the voltage applied to the starter motor in the split bus system. This higher voltage is necessary to prevent damage to certain instruments in the service load and to assure satisfactory operation of the electrical equipment essential to operation of the aircraft engine.

After the aircraft engine has started, contacts S–9a and S–9b are opened thus de-energizing coils R–5 and R–13 and causing contactors R–5a and R–13a to open. Opening contactor R–13a disconnects power to R–13 IND thus de-energizing R–14 and opening contactor R–14a. The other relays that were energized also de-energize when contacts S–9a and S–9b open thus returning to their initial condition as shown in Figure 2.

The overall circuit arrangement in the present invention is especially useful as starting equipment for squadrons or groups of aircraft composed of some planes having the common bus electrical system and others having the split bus electrical system. The starter cart operator performs the same manual starting operation regardless of the type of electrical system in the aircraft since the starting circuit senses the type of electrical circuit in the aircraft and makes the necessary circuit changes within itself to assure that no damage will occur to the electrical components in either the aircraft or in the starter cart.

On common bus system aircraft the two electrical receptacles 50 and 52 are of such a type as to permit the insertion of either oval or rectangular type power cable plugs. This is not possible on split system aircraft where a special shield 25 is mounted around the oval receptacle to prevent accidental insertion of the rectangular power cable plug and this prevents accidental application of the pre-start reduced voltage in the starter cable from entering the aircraft service circuit which requires normal level voltages at all times.

Should this shield be missing, either through improper maintenance or damage, and an improper plug of a conventional split bus power system be inserted by mistake, serious aircraft damage might result. The resulting low voltage on the service circuit during an engine start might cause what is known in the industry as a "hot start," which usually necessitates an engine examination.

With the circuit of this invention, however, no difficulty will result regardless of which cable enters either receptacle on a common bus aircraft or on a split bus aircraft. In the latter case the circuit would mistakenly sense the aircraft as a common bus type and would by-pass the soft or low voltage start without seriously damaging results.

The invention further provides novel circuit arrangements for controlling the current and voltage supplied by the starter cart to the aircraft starting motor which limits the magnitude of the initial current surge supplied to the aircraft regardless of the type of electrical circuit in the aircraft thus reducing the danger of damage to the starting circuit equipment due to the initial current surge and its accompanying starting shock.

The invention may be embodied in other specific forms and used with other types of internal combustion engines in devices other than aircraft without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an auxiliary power unit having a multi-conductor power cable adapted to be connected to the electrical circuit of a device powered by an internal combustion engine during the engine starting operation, two sources of electrical power, electrical switching means arranged to connect said sources either to different conductors or in parallel to the same conductors in said cable, and means responsive to a predetermined circuit connection in the electrical circuit in said device for controlling said switching means.

2. A power unit as defined in claim 1 wherein one of said sources of power has means preventing the electrical current supplied by said source from exceeding a predetermined value.

3. A power unit as defined in claim 1 further having a circuit operable only when said sources are connected to different conductors to reduce the magnitude of voltage supplied by one of said sources prior to the initiation of the starting operation of said turbine.

4. An auxiliary power unit adapted to be used to supply electrical power to the starting motors of aircraft engines on aircraft having different types of electrical wiring systems, said power unit including switching means for establishing different power circuit connections, and a sensing circuit responsive to the type of electrical wiring system in the aircraft for controlling operation of said switching means.

5. In an electrical power unit as described in claim 4, a generator having an armature winding connected to said power circuit connections by said switching means and means responsive to the armature current of said generator to control the generator to prevent the armature current from exceeding a predetermined value.

6. In an auxiliary power unit adapted to supply electrical power to the starting motors of internal combustion engines in devices having different types of electrical wiring systems, a source of electrical power, circuit means for adjusting the power supplied by said source, switching means responsive to the type of electrical wiring system in the device for controlling operation of said circuit means to cause the magnitude of the voltage supplied by said power unit to the starter motor just prior to the initiation of the starting operation to be adjusted in accordance with the type of electrical wiring system.

7. In an electrical circuit for supplying power to a starter motor for a gas turbine engine during the turbine starting operation: a direct current generator having a field winding, an armature winding and an auxiliary winding operative to produce an electrical output proportional to the current flow in said armature winding; circuit means connecting said armature winding to the starter motor; current responsive means connected in circuit relation with said auxiliary winding; and a variable impedance in series with said field winding controlled by said current responsive means for preventing the current supplied by said armature winding from exceeding a predetermined magnitude.

8. In an electrical circuit for supplying power to a starter motor for a gas turbine engine during the turbine starting operation: a direct current generator having a field winding, a main armature winding and an auxiliary armature winding; circuit means connecting the armature winding to said starter motor; means to reduce the armature voltage below its rated value prior to the initiation of said starting operation; means responsive to the initiation of the turbine starting operation for rendering said voltage reducing means ineffective; and current responsive means connected in circuit relation with said auxiliary winding operative to prevent the current supplied by said armature winding from exceeding a predetermined magnitude.

9. A method of operation of an auxiliary power unit having a sensing circuit and power circuits adapted to be used to supply electrical power to the starting motor of an aircraft engine with aircraft having different types of electrical circuit systems comprising the steps of: electrically connecting the power unit to the electrical circuit in said aircraft; energizing said sensing circuits to effect completion of different power circuits in accordance with the type of electrical circuit in the aircraft; and energizing the completed power circuit.

10. A method of operation of an auxiliary power unit having a sensing circuit and power circuits adapted to be used to supply electrical power to the starting motor of an aircraft engine with aircraft having different types of electrical circuit wiring systems comprising the steps of: electrically connecting the power unit to the electrical circuit in the aircraft; supplying voltage to said sensing circuits to control circuit connections in said power circuits determined by the type of electrical wiring system in the aircraft; and then producing a voltage to be applied to the starting motor whose initial magnitude depends upon said circuit connections in said power circuits.

11. A method of operation of an auxiliary power unit having switching circuits for controlling the power output characteristics of a power source arranged to be connected to a power circuit adapted to be connected to the starting motors of gas turbine engines of devices having different types of electrical wiring systems comprising the steps of: electrically connecting said power unit to the electrical wiring system in one of said devices; supplying a voltage to said electrical system to effect operation of said switching circuits; and then connecting said power source in said auxiliary power unit to said power circuit.

12. In combination, a portable starter unit adapted to be connected to the starter motor and service equipment associated with a gas turbine engine in devices having the starting motor and service equipment interconnected with different types of electrical wiring systems comprising: a pair of direct current generators; a storage battery; and means responsive to the type of electrical wiring system for connecting one of said generators and said storage battery in parallel to the service circuit and the other generator to the starter motor during the starting operation of a turbine engine associated with one of said types of electrical wiring systems and for connecting said storage battery and a generator in parallel to the starter motor and service equipment during the starting operation of a turbine engine associated with another of said types of said electrical wiring systems.

13. In combination; a portable starter unit adapted to be connected to a starting motor and service equipment associated with a gas turbine engine in devices having the starter motor and service equipment interconnected with different types of electrical wiring systems comprising: a first direct current generator; means for regulating the maximum current output supplied by said generator; a second direct current generator; a storage battery; means responsive to the type of electrical wiring system for automatically connecting the first generator to said starter motor and the second generator and battery in parallel to the service circuit during the starting operation of a turbine engine associated with one of said types of electrical wiring systems and for automatically connecting the first generator and said storage battery in parallel to the starter motor and service equipment during the starting operation of the turbine engine associated with another of said types of electrical wiring systems.

14. The combination as defined in claim 13 together with additional means for controlling the voltage of said first generator; and a circuit arrangement for regulating said additional means to reduce the voltage of said first generator prior to the initiation of the starting operation only when said storage battery and said second generator are connected in parallel.

15. The combination as defined in claim 13 wherein said current control means is automatically adjusted to prevent the current from said first generator from exceeding a first predetermined magnitude when said generator is connected to said starting motor and to prevent the current from said first generator from exceeding a second magnitude when said first generator is connected in parallel with said battery.

16. In an auxiliary power unit adapted to be used for supplying power to the starter motors and service circuits of gas turbine engines in devices having two different electrical wiring systems where one of said systems has the starter motor and service circuits connected the same power bus and another of said systems has the starter motor and service circuits connected to electrically independent power busses: a first generator; a second generator; a storage battery; and means responsive to the type of electric wiring system for connecting the storage battery and one generator in parallel to the service circuits and for limiting the maximum current supplied by the generator connected in the starter motor when used with either of said types of wiring systems.

References Cited in the file of this patent

UNITED STATES PATENTS

| | | |
|---|---|---|
| 2,405,676 | Strub | Aug. 13, 1946 |
| 2,624,849 | Bennett-Powell | Jan. 9, 1953 |
| 2,662,986 | Vintenon | Dec. 15, 1953 |
| 2,680,202 | Vintenon | June 1, 1954 |

UNITED STATES PATENT OFFICE

CERTIFICATE OF CORRECTION

Patent No. 2,798,166

July 2, 1957

H. Peter Karen

It is hereby certified that error appears in the printed specification of the above numbered patent requiring correction and that the said Letters Patent should read as corrected below.

Column 3, line 14, for "call" read -- cart --; column 4, line 25, for "G-32" read -- G-29 --; column 7, line 45, for "started" read -- starter --; column 12, line 67, for "in the" read -- to the --.

Signed and sealed this 3rd day of September 1957.

(SEAL)
Attest:
KARL H. AXLINE

Attesting Officer

ROBERT C. WATSON
Commissioner of Patents